Patented Nov. 6, 1934

UNITED STATES PATENT OFFICE 1,979,595

PRODUCTION OF IRON OXIDE PIGMENT

Robert O. Wood, Hamburg, N. Y., assignor to National Aniline & Chemical Company, Inc., New York, N. Y., a corporation of New York No Drawing. Application February 26, 1930, Serial No. 431,633

11 Claims. (Cl. 134—59)

This invention relates to the production of an inert ferric oxide suitable for use as a pigment, and is concerned with the conversion of certain waste products containing iron oxides into a ferric oxide pigment. The waste products to which the invention particularly relates are the iron oxide reduction sludges, consisting essentially of black magnetic iron oxide, and usually containing free iron and other substances, which are produced in the so-called neutral reduction of nitrobenzene, or other organic nitro compounds, by the action of iron and an acid.

An object of the invention is to provide a process for the production of a ferric oxide suitable for use as a pigment in paints, etc.

Another object of the invention is the utilization of the iron oxide reduction sludges above described, and similar products for the production of a red pigment.

A further object of the invention is the calcining of an iron oxide reduction sludge in the presence of a stabilizer for the production of a red pigment.

Other objects of the invention will in part be obvious and will in part appear hereinafter.

The invention accordingly comprises the several steps of the process and the relation of one or more of such steps with respect to each of the others thereof, which will be exemplified in the following description.

According to one feature of the present invention, an iron oxide reduction sludge of the character above described, preferably reduced to a fine state of division by grinding for a long period of time, is calcined in the presence of air, or preferably, in the presence of steam and air. According to a preferred procedure, the calcination is also carried out in admixture with a neutral insoluble and infusible compound, but it may be carried out in the presence of an oxide or hydroxide of a metal selected from the group comprising strontium, barium, calcium or magnesium.

According to another feature of the invention an iron oxide reduction sludge is mixed with an alkaline compound of an alkali-forming metal or ammonia, preferably by grinding together under water for a long period of time, and the mixture is calcined in the presence of air, or preferably, of air and steam. Depending on the nature of the alkaline compound employed it may be removed before, during, or after the calcining operation, or it may be converted into a neutral, insoluble, and infusible compound before or after the calcining operation.

During the grinding the iron oxide reduction sludge changes from the condition of a fine slurry to a thick paste. Whether the thickening of the slurry is due to hydration of the oxide or is due to the extremely finely divided condition of the ground sludge is not known. Since the particles and small lumps of metallic iron contained in the sludge disappear in the grinding operation, it is probable that this free iron in its extremely fine state of division in the presence of water and the alkaline compound is rapidly converted to the oxide or hydrate. In addition to reducing the size of the particles of sludge, the grinding also causes a thorough intermingling of the iron oxide sludge and alkaline compound employed.

Whatever metallic iron is not oxidized in the grinding operation becomes readily oxidized to ferric oxide in the calcining operation due to its finely divided state. The fine state of division of the particles also appears to permit the oxidizing gases to readily penetrate the mass by absorption or adsorption during the calcining operation, and results in a more completely and uniformly oxidized product which may be used as a pigment without further grinding.

I am unable to explain definitely the stabilizing effect of the alkaline compound or of the neutral, insoluble, infusible compound during the calcining operation. It is known that ferric oxide assumes a bluish tinge when it is subjected to too high a temperature. This effect, which is undesirable in a pigment, is called "burning" and the bluish oxide is called "burnt" oxide in the art. In the presence of the stabilizer such as lime, magnesium oxide, calcium hydroxide or calcium sulfate, etc., a higher temperature may be employed without producing a "burnt" oxide. Consequently the presence of a stabilizer in the calcining operation permits a wider variation in the temperature range at which calcining can be carried out. In general, this temperature varies from a dull red heat up to a bright red heat, and the shade of the pigment produced will vary depending on the temperature employed, as is understood in the art. The stabilizer preferably is added to the iron oxide sludge during the grinding operation, but it may be added when grinding is substantially finished. The use of a neutral, substantially insoluble, difficultly fusible or infusible, compound, such as calcium sulfate, is preferred for this purpose, and may be used entirely in place of alkaline compounds; or, where an alkaline calcium compound is employed in the grinding operation, it may be converted into calcium sulfate before calcining.

As illustrative embodiments of a manner in which the invention may be carried into practice and of the products produced, the following examples are presented: the parts are by weight.

*Example 1.*—Crude aniline iron sludge is mixed with about 3 to 5 per cent of its weight of lime and about 50 to 75 per cent. of water is added to the mixture which is then ground in a ball mill or other suitable apparatus for about 24 hours. After grinding, ammonium sulfate is added in excess to the dark olive-green mixture to convert the lime into neutral calcium sulfate. The mixture is then calcined at a bright red heat with access of air for about one hour to produce ferric oxide. The ferric oxide produced as the result of the calcining operation is of a bright red color and is suitable for use as a pigment.

*Example 2.*—Crude air-dried aniline sludge is ground under water for about 24 hours and is then heated at a bright red heat in a tunnel kiln for about one hour, in an atmosphere of air and steam. The ferric oxide produced is relatively inert, is of a brick red color, and is suitable for use as a pigment.

Magnesium oxide, ammonium hydroxide, caustic soda, sodium carbonate, calcium hydroxide, and other alkaline compounds of the alkali-forming metals may be mixed with the iron oxide sludge before calcining, in place of the lime in Example 1. Magnesium oxide appears to produce the brightest ferric oxide but because of its alkaline reaction its presence in the pigment is undesirable. It may be converted into its sulfate after calcining, by treatment with sulfuric acid, and the magnesium sulfate washed out.

When ammonium hydroxide is used, it is volatilized in the calcining operation. It is not desirable to have caustic soda or soda ash present in the calcination, since sodium ferrite may be formed. However, caustic soda may be mixed with the iron oxide sludge, and may then be washed out before the calcination. When the iron oxide sludge is ground with a soluble alkaline compound, such as caustic soda, sodium carbonate, etc., the soluble alkaline compound is preferably removed before calcining. In this case, after removal of the alkaline compound, the calcination may be performed in the presence of a substantially insoluble, difficultly fusible or infusible compound, e. g., calcium sulfate or calcium hydroxide, and air, and/or in an atmosphere of steam.

The wet grinding has an additional advantage in that, when the wet slurry is introduced into the furnace, the oxide does not dust and pass out through the flue, but chips off in the form of small flakes of substantially uniform size. These flakes are readily penetrated by the oxidizing gases. Grinding may be performed with or without the addition of an alkali. The longer the grinding and the finer the particles of the sludge, the better will be the color and covering power of the ferric oxide.

The invention is not limited to the proportions stated in the examples, for these may be varied within wide limits without departing from the scope of the invention.

Since certain changes in carrying out the above process may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A process for the production of a pigment which comprises finely grinding an iron oxide reduction sludge, in an aqueous alkaline medium and calcining the ground sludge.

2. A process for the production of a pigment which comprises finely grinding in an aqueous alkaline medium an iron oxide reduction sludge resulting from the reduction of an organic nitro compound, and calcining the ground sludge in the presence of air.

3. A process for the production of a pigment which comprises finely grinding an iron oxide reduction sludge in an aqueous medium, and calcining the ground sludge in the presence of air and steam.

4. A process for the production of a pigment which comprises mixing an iron oxide reduction sludge with an alkaline compound and water, grinding the mixture to render the iron oxide reduction sludge finely divided, and then calcining the finely ground iron oxide reduction sludge in a condition free from an alkaline compound of an alkali metal in the presence of air.

5. A process for the production of a pigment which comprises grinding an iron oxide reduction sludge with an aqueous alkaline compound to mix the same and render the iron oxide reduction sludge finely divided, and then calcining the finely ground iron oxide reduction sludge in a condition free from an alkaline compound of an alkali metal in an atmosphere of air and steam.

6. A process for the production of a pigment which comprises finely grinding an iron oxide reduction sludge in admixture with an aqueous alkaline compound of an alkali metal, removing the said alkaline compound and then calcining the iron oxide reduction sludge in an atmosphere of steam and air.

7. The process for the production of a pigment which comprises mixing an iron oxide reduction sludge with aqueous ammonium hydroxide by grinding for a long period of time, and then calcining the mixture with access of air.

8. A process for the production of a pigment which comprises mixing a quantity of crude aniline iron sludge with about 3 to 5% of lime and 50 to 75% of water, grinding the mixture for about 24 hours, and calcining the mixture for about one hour to produce a ferric oxide pigment.

9. A process for the production of a pigment which comprises grinding an iron oxide reduction sludge in admixture with an aqueous alkaline compound of an alkaline earth metal and calcining the ground sludge.

10. A process for the production of a pigment which comprises grinding an iron oxide reduction sludge in admixture with an aqueous alkaline compound of an alkali metal, separating said alkaline compound from the ground sludge, and then calcining the ground sludge in the presence of air and steam.

11. A process for the production of a pigment which comprises grinding an iron oxide reduction sludge in admixture with an alkaline compound of an alkali metal, separating said alkaline compound from the ground sludge and calcining the ground sludge in admixture with an alkaline compound of an alkaline earth metal.

ROBERT O. WOOD.